Patented Nov. 28, 1922.

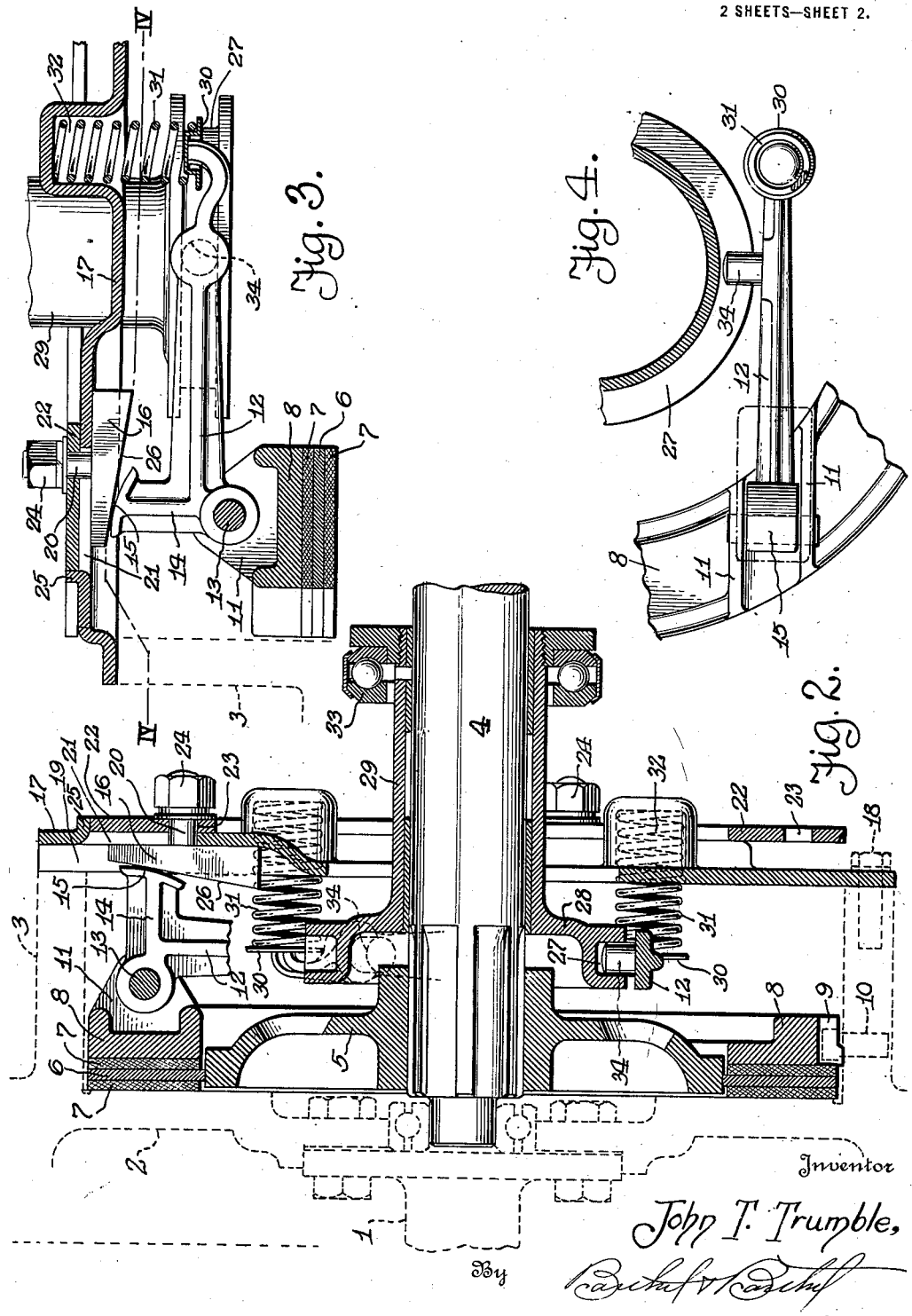

1,437,121

UNITED STATES PATENT OFFICE.

JOHN T. TRUMBLE, OF DETROIT, MICHIGAN.

CLUTCH.

Application filed May 1, 1920. Serial No. 378,087.

*To all whom it may concern:*

Be it known that I, JOHN T. TRUMBLE, a citizen of the United States of America, residing at Detroit, in the county of Wayne and State of Michigan, have invented certain new and useful Improvements in Clutches, of which the following is a specification, reference being had therein to the accompanying drawings.

This invention relates to friction devices commonly known as clutches for transmitting motion from a driving to a driven member, and more particularly to such devices adapted for use in m6tor vehicle construction. An object of the invention is to provide an arrangement whereby, when the force which tends to normally hold the friction members in frictional contact, is relieved, the friction members will be separated by such operation. It is also an object of the invention to provide ready means for adjusting the friction members as they wear away in use and to so arrange the yieldable power means and levers for holding the friction members in frictional contact as to apply pressure evenly and secure a uniform engagement of the friction members.

A further object is to provide a very compact and efficient construction having certain other new and useful features, all as hereinafter more fully set forth.

With the above and other ends in view the invention consists in the matters hereinafter set forth and more particularly pointed out in the appended claims, reference being had to the accompanying drawings in which—

Fig. 2 is a transverse vertical section of the same substantially upon the line II—II of Fig. 1;

Fig. 3 is a sectional detail substantially upon the line III—III of Fig. 1; and

Fig. 4 is a sectional detail substantially upon the line IV—IV of Fig. 3.

Figure 1:
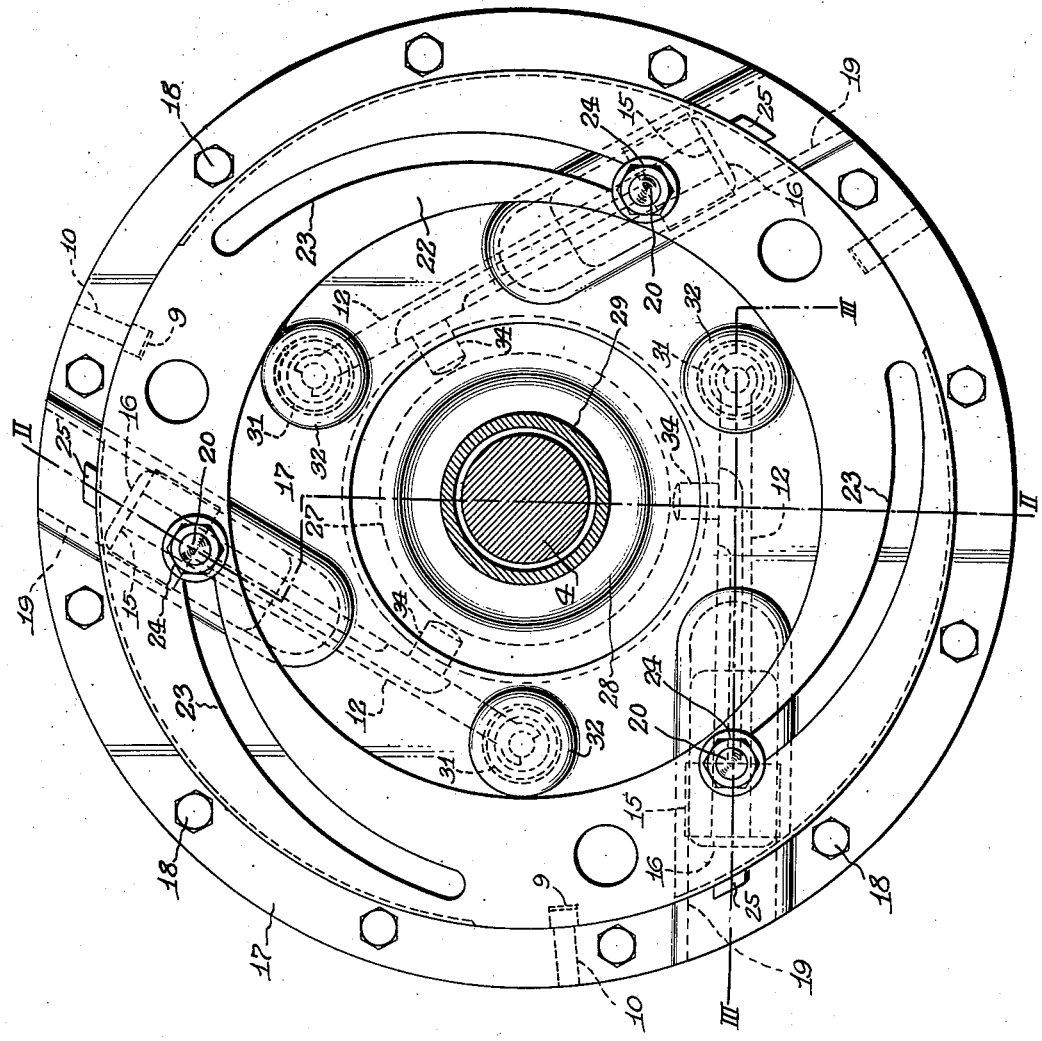
Figure 1 is an end elevation of a device illustrative of the invention.

As indicated in dotted lines in Fig. 2, 1 indicates a driving shaft which in motor vehicle construction would be the crank shaft of the engine, and 2 indicates a suitable flywheel having a rearwardly extending annular flange 3 forming a chamber or recess in the rear side of the fly wheel to receive the clutch mechanism. 4 indicates a driven shaft which is supported in longitudinal axial alignment with the drive shaft 1 and upon the forward end of the driven shaft adjacent the fly wheel, is a driven member or wheel 5 which is secured to the end of the driven shaft to turn therewith. Mounted upon the periphery of the member 5 to turn therewith and to slide longitudinally thereon, is a friction ring 6 which is provided upon each side with friction rings 7 or friction lining of any suitable material secured firmly to the ring 6 and the fly wheel is formed with an annular contact surface to be engaged by the friction lining 7 upon one side of the ring 6, the friction lining at the opposite side of the ring being opposed to a master ring 8 which is connected with the rim 3 of the fly wheel to turn therewith and to move longitudinally thereof toward and from the friction ring 6, by providing a suitable slot or slots 9 in the periphery of the ring which is engaged by the head of a pin indicated at 10, all carried by the rim 3 of the fly wheel. The master ring 8 is provided with laterally extending ears 11 to which a plurality of power levers 12 are pivotally attached by means of pivot pins 13 extending through eyes in the lever and through openings in the ears which form bearings therefor. These power levers 12 are of substantially bell crank construction, each lever being formed with a laterally or rearwardly extending arm 14 which is provided at its end with a cam face 15 adapted to engage the inclined face of a block 16 carried by a cover plate 17 which is secured at its periphery by bolts 18 to the edge of the flange or rim 3 of the fly wheel. There are shown, preferably, three of these power levers 12 and there is a block 16 for each lever, said blocks being seated within guide channels 19 formed in the plate 17 by striking up or forming up said plate to provide these guide channels which are just of sufficient width to receive the blocks 16 and are open through the edge of the cover plate. Each block 16 is adjustably held within its guide channel by means of a stud 20 extending from the bottom of the block intermediate its ends outwardly through a slot 21 in the plate 17 in the bottom of the channel 19, said slot extending longitudinally of the channel. An adjusting ring 22 is mounted upon the outer side of the cover plate over the slots 21 and resting upon the three raised portions of the plate formed by the depressing of the metal outwardly to form the channels, and this adjusting ring is provided with curved slots 23 which are formed in the ring eccentric to the axis of the ring. The studs 20 extend through these slots 23 and lock nuts 24 on the outer ends of the studs are provided to securely hold the ring 22 in place and also hold the blocks 16 in adjusted position in their channels, the adjusting ring 22 being held concentric with the axis of rotation of the fly wheel and driven shaft 4 by means of lugs 25 struck up from the cover plate 17 out of the ends of the slots 21 therein, said lugs 25 engaging the periphery of the ring to hold it in concentric relation with the axis of rotation.

Each block 16 is formed with an inner side surface adapted to be engaged by the cam ends 15 of the bell crank or power levers 12, said inner side surface 26 of each block forming a plane which is inclined to the plane of the bottom or opposite side of the block, the outer ends of these blocks being the narrow ends so that by adjusting the blocks outwardly in their channels 19 their thicker portions are brought into engagement with the levers and thus the master ring 8 which carries the levers will be adjusted toward the friction ring 6 and friction surface of the fly wheel. Therefore as the friction lining 7 wears away in use, the master ring 8 may be adjusted toward the fly wheel to give greater frictional contact, by adjusting the blocks 16 outwardly in their channels. The simultaneous even adjustment of the blocks 16 is accomplished by a rotative movement of the ring 22, the nuts 24 being first loosened to release the ring and blocks and permit the blocks to slide in their channels and the ring to turn in engagement with the studs 20 on the blocks. Because of the eccentric relation of the slots 23 in the ring to the axis of rotation of the ring, the turning of this ring clockwise will cause the blocks to be moved outwardly in their channels by engagement of the studs on the blocks with these eccentric slots. The simultaneous and accurate adjustment of the blocks is therefore accomplished by a simple rotation of the ring 22 after the loosening of the nuts and after such adjustment the blocks are securely held in adjusted position and the ring clamped into position to which it has been turned, by the turning up of the nuts 24 on the studs against the ring.

The inwardly extending long arm of each bell crank lever 12 is formed with a laterally extending stud 34 intermediate its ends to engage a peripheral groove or channel 27 formed in the head portion 28 upon a sleeve 29 which is slidable longitudinally upon the driven shaft 4. The several bell crank levers are so attached to the master ring that they extend in the direction of their length substantially tangential to the periphery of the head 28 on the sleeve 29 and the studs 34 on these levers extend laterally from the levers into the channel 27 in a direction radially of the axis of rotation of the sleeve so that these levers, as shown in elevation in Fig. 4, are substantially straight in plan view but each is bent laterally beyond the stud 34 in edge elevation to engage a seat member 30 carried upon the end of a coiled spring 31, which coiled spring is seated at its opposite end within a suitable socket 32 provided therefor by forming up the cover plate 17 with these sockets to receive the springs, as clearly illustrated in Fig. 3. There is a spring 31 for each bell crank lever and these several springs normally exert a pressure to swing the long ends of the bell crank levers inwardly or toward the fly wheel and thus cause the short arms 14 of the levers to swing into contact with the inclined surfaces 26 of the blocks 16 and thus force the master ring 8 toward the fly wheel and firmly clamp the friction ring 6 therebetween, thereby frictionally holding this ring to turn with the fly wheel and through its connection with the member 5 on the driven shaft to transmit motion to the driven shaft or causing both driving and driven shafts to turn in unison.

To swing the several bell crank levers against the action of the springs 31 and thus relieve the master ring 8 from the wedging action of these levers engaging the blocks 16, the sleeve 29 is moved outwardly in a longitudinal direction upon the driven shaft 4 by any suitable lever means, not shown, adapted to act against a suitable anti-friction bearing 33 provided upon the outer end of the sleeve. When so moved, the outward movement of the sleeve exerts a pull upon the studs 34 of the levers and the outward swinging movement of the inner ends of these levers is resisted by the springs 31, so that this pull upon the levers intermediate their ends holds the ends 14 or short arms of the levers in firm contact with the blocks 16, said levers turning upon their pivotal connections 13 with the master ring 8 and the inner ends of their long arms 12 swinging outwardly, the cam faces 15 on the short arms at the same time sliding upon the inclined faces 26 of the blocks. A bodily outward movement of the levers is therefore effected which movement, due to the connection of the levers with the master ring 8, moves said ring positively away from the friction ring 6 whenever the sleeve 29 is moved outwardly, and the friction members are therefore positively separated, leaving the driven member 5 and driven shaft to turn freely independently of the fly wheel and driving shaft.

As each bell crank lever is provided with a separate spring for operating it; these bell crank levers act independently and thus give an even distribution of power, to force the friction members into frictional contact. As the levers and springs are all housed within the fly wheel which is closed by the cover plate 17, a very compact construction is secured and dirt and other matter which might accumulate adjacent the friction members and prevent their proper functioning is obviated. Further, the adjusting ring 22 provides a very convenient means for adjusting the frictional contact of the friction members, it being only necessary to loosen the bolts 24 and turn the ring to adjust all of the blocks simultaneously in their guide ways.

Obviously the particular shape and arrangement of the several levers 12 may be varied as desired and the particular construction and number of friction members may also be varied to give additional frictional contact surface or the contour of these friction members may be varied to suit the conditions of use, it being understood that the form of friction device is old and well known and that any suitable construction may be employed. Other changes may be made in the construction and arrangement of parts within the scope of the appended claims without departing from the spirit of the invention and I do not therefore limit myself to the particular arrangement shown.

Having thus fully described my invention, what I claim is:—

1. In a device of the character described, the combination with a driving member and a driven member, of a friction member connected to the driving member to turn therewith and to move relatively thereto, a bell crank lever pivotally connected to the friction member and having a laterally extending short arm and an inwardly extending long arm, means carried by the driving member opposite the pivotal connection of the lever to the friction member and having an inclined surface for engaging the short arm of the lever and adjustable relative thereto and longitudinally of the lever, a spring carried by the driving member and engaging the long arm of the bell crank lever, and a longitudinally movable member operatively connected with the long arm of the bell crank lever for turning the same against the action of said spring.

2. In a device of the character described, the combination of a driving member and a driven member, a friction member for operatively connecting said driving and driven members, an abutment member carried by the driving member, a block movable upon the abutment member and having an inclined side, a lever member pivotally connected to the friction member and having a short arm to engage the inclined side of the block, said inclination being in the direction of the length of said lever, yieldable means for turning the lever upon its pivotal connection with the friction member, and a rotatable member having operative connection with said block to move the same longitudinally of the lever.

3. In a device of the character described, the combination of a driving member and a driven member, a friction member rotatable with the driving member and movable relative thereto, a plate rotatable with and secured to the driving member, a plurality of bell crank levers pivotally attached to the friction member and each having a laterally extending short arm and an inwardly extending long arm, blocks carried by said plate and having faces inclined in the direction of the length of said levers to engage the short arms of the levers, the point of engagement of each of said short arms with said blocks being in a plane passing through said lever pivot, which plane is substantially at right angles to the longitudinal plane of the long arm of the lever, and means carried by the plate and operatively connected with the several blocks for adjusting said blocks longitudinally of said levers.

4. In a device of the character described, the combination of a fly wheel having a flange, a driven member, a friction ring operatively connected with the driven member, a master ring frictionally engaging the friction ring, a plate secured at its periphery to the flange of the fly wheel and formed with channels, blocks slidable in said channels and formed with inclined inner faces, levers pivotally attached to the master ring at points opposite said blocks and each having a laterally extending arm to engage the inclined face of one of the blocks and swing upon its pivotal connection with the master ring longitudinally of said face, and an inwardly extending long arm, springs carried by said plate and engaging said long arms of the levers, and a rotatable member carried by the plate and having operative connection with the several blocks to adjust said blocks in their channels longitudinally of said levers.

5. In a device of the character described, the combination with a driving shaft and a driven shaft arranged in axial alignment, a fly wheel on the driving shaft having a peripheral flange, a driven member secured to the driven shaft, a friction member operatively connected to the driven member, a follower ring connected to the fly wheel flange to turn therewith and to move relatively thereto into engagement with the friction ring, a plate secured at its periphery to the edge of the fly wheel flange and formed with channels, and slots extending longitudinally of said channels in the bottoms thereof, blocks in said channels having inclined inner surfaces, studs on the blocks extending through the slots in the bottoms of the channels, an adjusting ring rotatable upon the plate and having cam slots through which the studs extend, and bell-crank levers pivotally connected to the follower member opposite said blocks and each having a short arm extending longitudinally from its pivotal connection with said ring and provided with a cam surface to engage the inclined faces of said blocks and swing longitudinally of said blocks, each of said levers having a long arm extending substantially at right angles to the short arm.

6. In a device of the character described, the combination of a driving shaft, a driven shaft in longitudinal axial alignment with the driving shaft, a fly wheel secured to the driving shaft and having a laterally extending annular flange, a driven member secured to the end of the driven shaft, a friction ring having operative connection with the driven member to turn therewith, a master ring having operative connection with the fly wheel flange to turn therewith and movable relatively thereto into frictional engagement with the friction ring, a plurality of bell crank levers pivotally connected to the master ring and each formed with a laterally extending short arm and an inwardly extending long arm, a plate secured at its periphery to the edge of the fly wheel flange, and formed with channels in its inner face, blocks slidable in said channels and having inclined inner faces to engage the short arms of the levers, means carried by the plate for simultaneously adjusting said blocks in their channels, a coiled spring engaging the inner end of the long arm of each bell crank lever, recesses formed in the said plate to receive said springs, a stud on the long arm of each lever intermediate its ends, and a sleeve slidable upon the driven shaft and having a channel at its inner end to receive said studs.

In testimony whereof I affix my signature in the presence of two witnesses.

JOHN T. TRUMBLE.

Witnesses:—
ANNA M. DORR,
CHAS. W. STAUFFIGER.